(12) United States Patent
Ogasawara et al.

(10) Patent No.: US 11,296,350 B2
(45) Date of Patent: Apr. 5, 2022

(54) CELL STACK DEVICE

(71) Applicant: NGK INSULATORS, LTD., Nagoya (JP)

(72) Inventors: Noriyuki Ogasawara, Nagoya (JP); Hirofumi Kan, Nagoya (JP); Makoto Ohmori, Nagoya (JP); Takashi Ryu, Nagoya (JP)

(73) Assignee: NGK INSULATORS, LTD., Nagoya (JP)

( * ) Notice: Subject to any disclaimer, the term of this patent is extended or adjusted under 35 U.S.C. 154(b) by 0 days.

(21) Appl. No.: 16/672,831

(22) Filed: Nov. 4, 2019

(65) Prior Publication Data

US 2020/0067124 A1 Feb. 27, 2020

Related U.S. Application Data

(63) Continuation of application No. PCT/JP2019/008429, filed on Mar. 4, 2019.

(30) Foreign Application Priority Data

Jul. 12, 2018 (JP) .............................. JP2018-132612

(51) Int. Cl.
*H01M 8/124* (2016.01)
*H01M 8/2484* (2016.01)

(52) U.S. Cl.
CPC ................................. *H01M 8/2484* (2016.02)

(58) Field of Classification Search
CPC .. H01M 8/2484; H01M 8/2428; H01M 8/243; H01M 2008/1293; H01M 8/1226; Y02E 60/50

USPC .......................................................... 429/459
See application file for complete search history.

(56) References Cited

U.S. PATENT DOCUMENTS

| 4,818,640 | A | * | 4/1989 | Fukuda | ............... | H01M 8/0284 |
| | | | | | | 429/509 |
| 5,786,105 | A | | 7/1998 | Matsushima et al. | | |
| 2005/0271909 | A1 | * | 12/2005 | Bai | ..................... | H01M 8/0258 |
| | | | | | | 429/414 |
| 2007/0243315 | A1 | * | 10/2007 | Buckley | .............. | H01M 4/8657 |
| | | | | | | 427/58 |

(Continued)

FOREIGN PATENT DOCUMENTS

JP 09-102323 A 4/1997
JP 2011-060747 A 3/2011

(Continued)

OTHER PUBLICATIONS

English language International Search Report for corresponding application No. PCT/JP2019/008429, dated Jun. 4, 2019 (2 pages).

(Continued)

*Primary Examiner* — Christian Roldan
(74) *Attorney, Agent, or Firm* — Flynn Thiel, P.C.

(57) ABSTRACT

A cell stack device includes a plurality of electrochemical cells, a manifold, a gas supply portion, and a gas collection portion. The manifold includes a gas supply chamber and a gas collection chamber that extend in a direction in which the electrochemical cells are arranged. A support substrate of an electrochemical cell includes a first gas channel and a second gas channel. The first gas channel is connected to the gas supply chamber, and the second gas channel is connected to the gas collection chamber.

7 Claims, 12 Drawing Sheets

(56) References Cited

U.S. PATENT DOCUMENTS

| | | | | |
|---|---|---|---|---|
| 2008/0038621 | A1* | 2/2008 | Ichigi | .................... C25B 9/65 |
| | | | | 429/458 |
| 2011/0065022 | A1 | 3/2011 | Min et al. | |
| 2017/0141426 | A1* | 5/2017 | Ohmori | .............. H01M 8/2484 |

FOREIGN PATENT DOCUMENTS

| | | |
|---|---|---|
| JP | 2015-053186 A | 3/2015 |
| JP | 2016-171064 A | 9/2016 |
| JP | 2017-017025 A | 1/2017 |

OTHER PUBLICATIONS

English Translation of the International Preliminary Report on Patentability, issued in corresponding International Application No. PCT/JP2019/008429 dated Jan. 21, 2021 (7 pages).
Japanese language International Search Report and Written Opinion for corresponding PCT/JP2019/008429, dated Jun. 4, 2019 (9 pages).

\* cited by examiner

CELL STACK DEVICE

CROSS-REFERENCE TO RELATED APPLICATIONS

This is a continuation of PCT/JP2019/008429, filed Mar. 4, 2019, which claims priority to Japanese Application No. 2018-132612, filed Jul. 12, 2018, the entire contents of which are hereby incorporated by reference.

TECHNICAL FIELD

The present invention relates to a cell stack device.

BACKGROUND ART

A cell stack device including an electrochemical cell and a manifold for supplying gas to the electrochemical cell is known. The electrochemical cell includes a support substrate provided with a gas channel and a power generation element portion supported by the support substrate. A supply gas is supplied from a base end portion of the support substrate to the gas channel, whereas unreacted gas is ejected from a leading end portion of the support substrate to the outside.

CITATION LIST

Patent Literature

Patent Literature 1: JP 2016-171064A

SUMMARY

Technical Problem

There is a demand for an improvement in the efficiency of gas usage in a cell stack device as described above. In view of this, the present invention aims to provide a cell stack device capable of improving the efficiency of gas usage.

Solution to Problem

A cell stack device according to an aspect of the present invention includes a plurality of electrochemical cells, a manifold, a gas supply portion, and a gas collection portion. The electrochemical cells are disposed spaced apart from each other. The manifold includes a gas supply chamber and a gas collection chamber that extend in an arrangement direction of the electrochemical cells. The manifold supports base end portions of the electrochemical cells. The gas supply portion is connected to the gas supply chamber. The gas supply portion is configured to supply gas to the gas supply chamber. The gas collection portion is connected to the gas collection chamber. The gas collection portion is configured to collect gas from the gas collection chamber. The electrochemical cells each include a support substrate extending from the manifold, and a power generation element portion supported by the support substrate. The support substrate includes at least one first gas channel and at least one second gas channel. The first gas channel is connected to the gas supply chamber and extends from a base end portion of the support substrate to a leading end portion of the support substrate. The second gas channel is connected to the gas collection chamber and extends from the base end portion of the support substrate to the leading end portion of the support substrate. The second gas channel is connected to the first gas channel at a leading end portion of the electrochemical cell. The gas supply portion is connected to the gas supply chamber on a first end portion side of the manifold in the arrangement direction, with respect to a center of the manifold. The gas collection portion is connected to the gas collection chamber on a second end portion side of the manifold in the arrangement direction, with respect to the center of the manifold.

With this configuration, unreacted gas in the gas that has flowed through the first gas channel flows through the second gas channel and unreacted gas in the gas that has flowed through the second gas channel is collected in the gas collection chamber of the gas manifold. Thus, it is possible to improve the efficiency of gas usage.

Also, the gas supply portion is connected to the gas supply chamber on the first end portion side in the arrangement direction and the gas collection portion is connected to the gas collection chamber on the second end portion side in the arrangement direction. This makes it possible to reduce the variation in the path length of the gas that flows in the path extending from the gas supply portion→the electrochemical cells→the gas collection portion between electrochemical cells.

Preferably, the gas supply portion is configured to supply a gas in a gas collection direction of the gas collection portion.

Preferably, the gas supply portion is configured to supply a gas in a direction intersecting the gas collection direction of the gas collection portion.

Preferably, the gas supply portion is configured to supply a gas in the arrangement direction.

Preferably, the gas supply portion is configured to supply a gas in a width direction of the electrochemical cell.

Preferably, the support substrate further includes a connection channel for connecting the first gas channel and the second gas channel at the leading end portion of the support substrate.

Preferably, the electrochemical cell further includes a connection member that is attached to the leading end portion of the support substrate. The connection member includes a connection channel for connecting the first gas channel and the second gas channel.

Advantageous Effects

According to the present invention, it is possible to improve the efficiency of gas usage.

DESCRIPTION OF EMBODIMENTS

Figure 1:
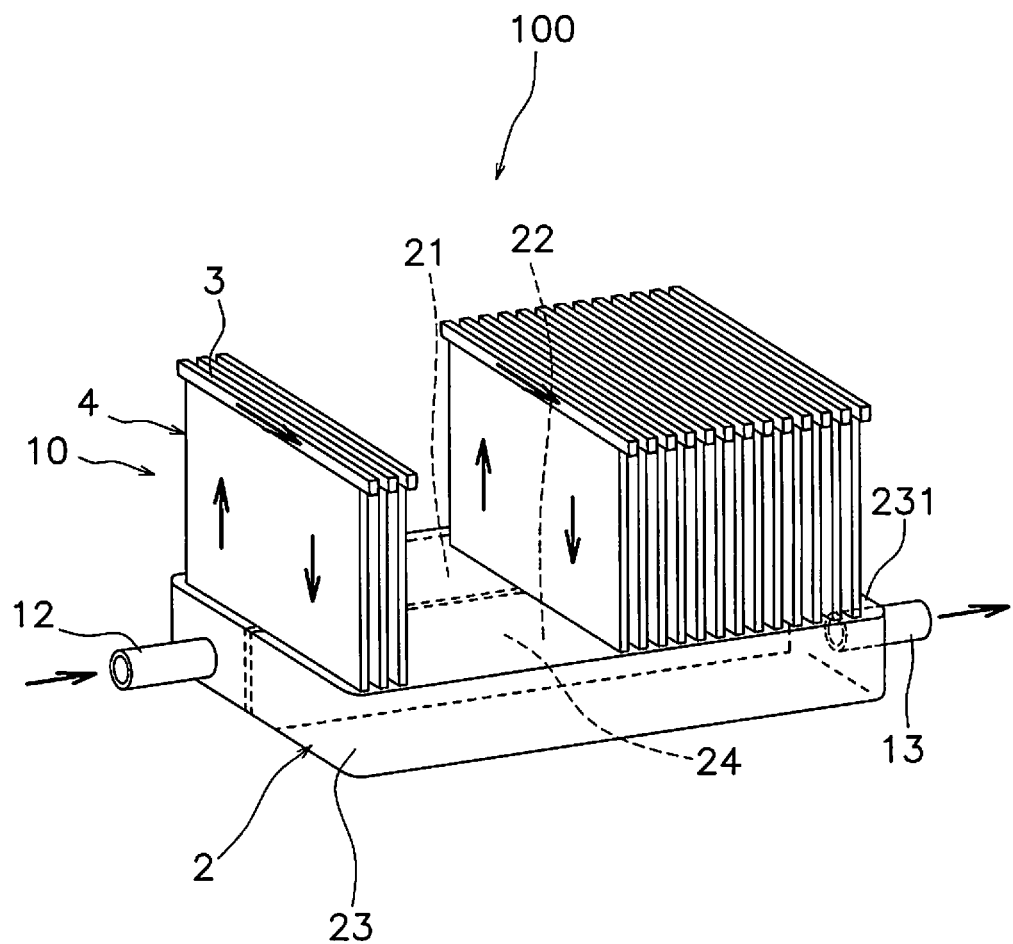
FIG. 1 is a perspective view of a cell stack device.
Figure 2:
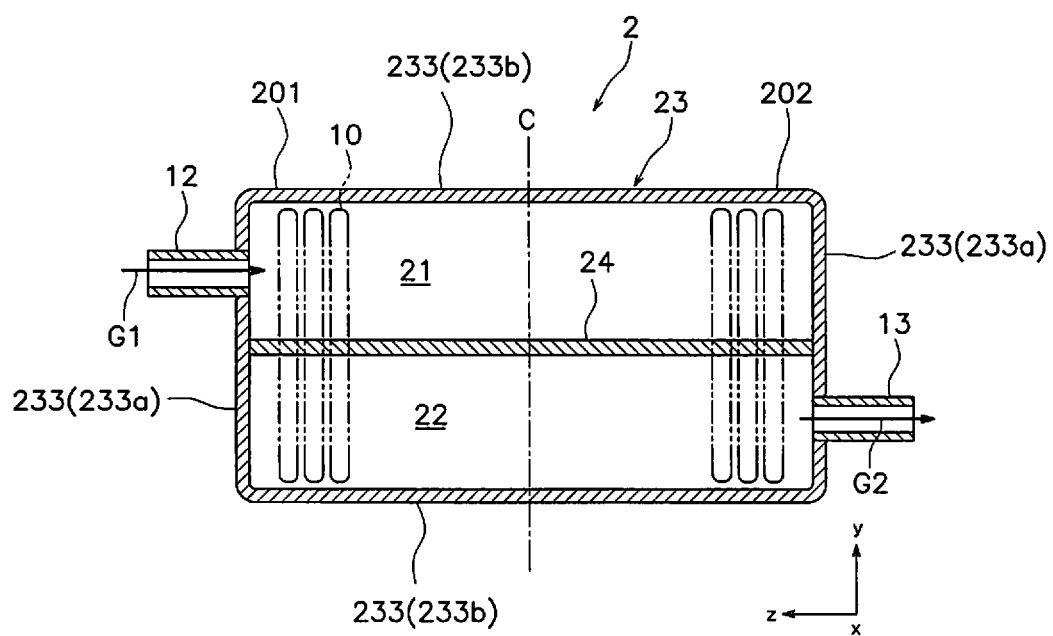
FIG. 2 is a cross-sectional view of a manifold.

Hereinafter, an embodiment of a cell stack device according to the present invention will be described with reference to the drawings. Note that this embodiment will be described using, as one example of an electrochemical cell, a fuel cell, more specifically, a solid oxide fuel cell (SOFC). FIG. 1 is a perspective view showing a cell stack device, and FIG. 2 is a cross-sectional view of a manifold. Note that some fuel cells are not shown in FIGS. 1 and 2.

Cell Stack Device

As shown in FIG. 1, a cell stack device 100 includes a manifold 2, a gas supply pipe 12 (one example of a gas supply portion), a gas collection pipe 13 (one example of a gas collection portion), and a plurality of fuel cells 10.

Manifold

The manifold 2 is configured to supply a gas to the fuel cells 10. Also, the manifold 2 is configured to collect a gas ejected from the fuel cells 10.

As shown in FIG. 2, the manifold 2 includes a gas supply chamber 21 and a gas collection chamber 22. The gas supply chamber 21 and the gas collection chamber 22 extend in an arrangement direction (the Z-axis direction) of the fuel cells 10. The manifold 2 includes a first end portion 201 and a second end portion 202 in the arrangement direction of the fuel cells 10. Note that a center line C shown in FIG. 2 indicates a center C of the manifold 2 in the arrangement direction.

Specifically, the manifold 2 includes a manifold main body 23 and a partition plate 24. The manifold main body 23 has an internal space. The manifold main body 23 has a rectangular parallelepiped shape.

The partition plate 24 partitions the space of the manifold main body 23 into the gas supply chamber 21 and the gas collection chamber 22. Specifically, the partition plate 24 extends in a length direction (the Z-axis direction) of the manifold 2 at a substantially central portion of the manifold 2 in a width direction (the Y-axis direction) thereof. Note that, in this embodiment, the length direction (the Z-axis direction) of the manifold 2 is the same as the arrangement direction of the fuel cells 10. The partition plate 24 needs not completely partition the space of the manifold main body 23 and a gap may be formed between the partition plate 24 and the manifold main body 23.

Figure 3:
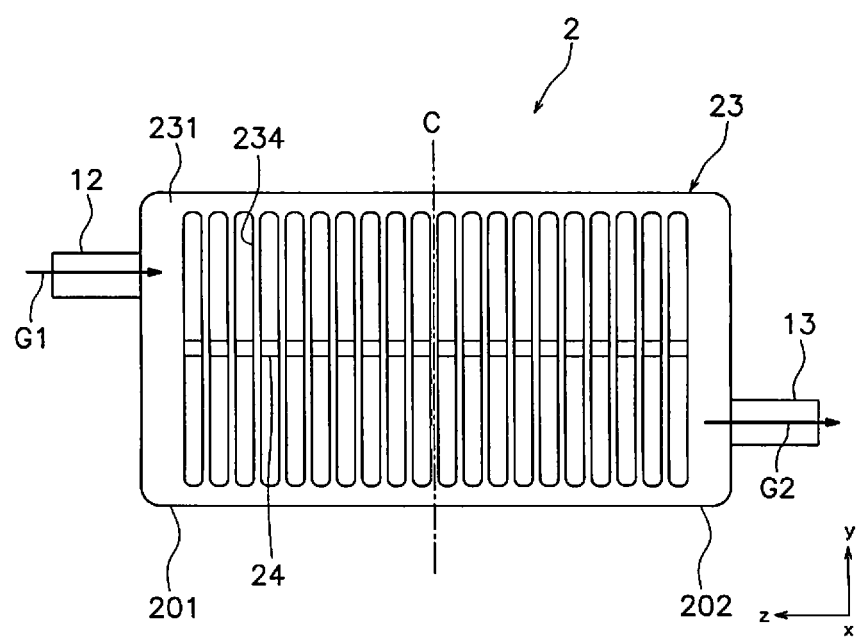
FIG. 3 is a plan view of the manifold.
Figure 4:
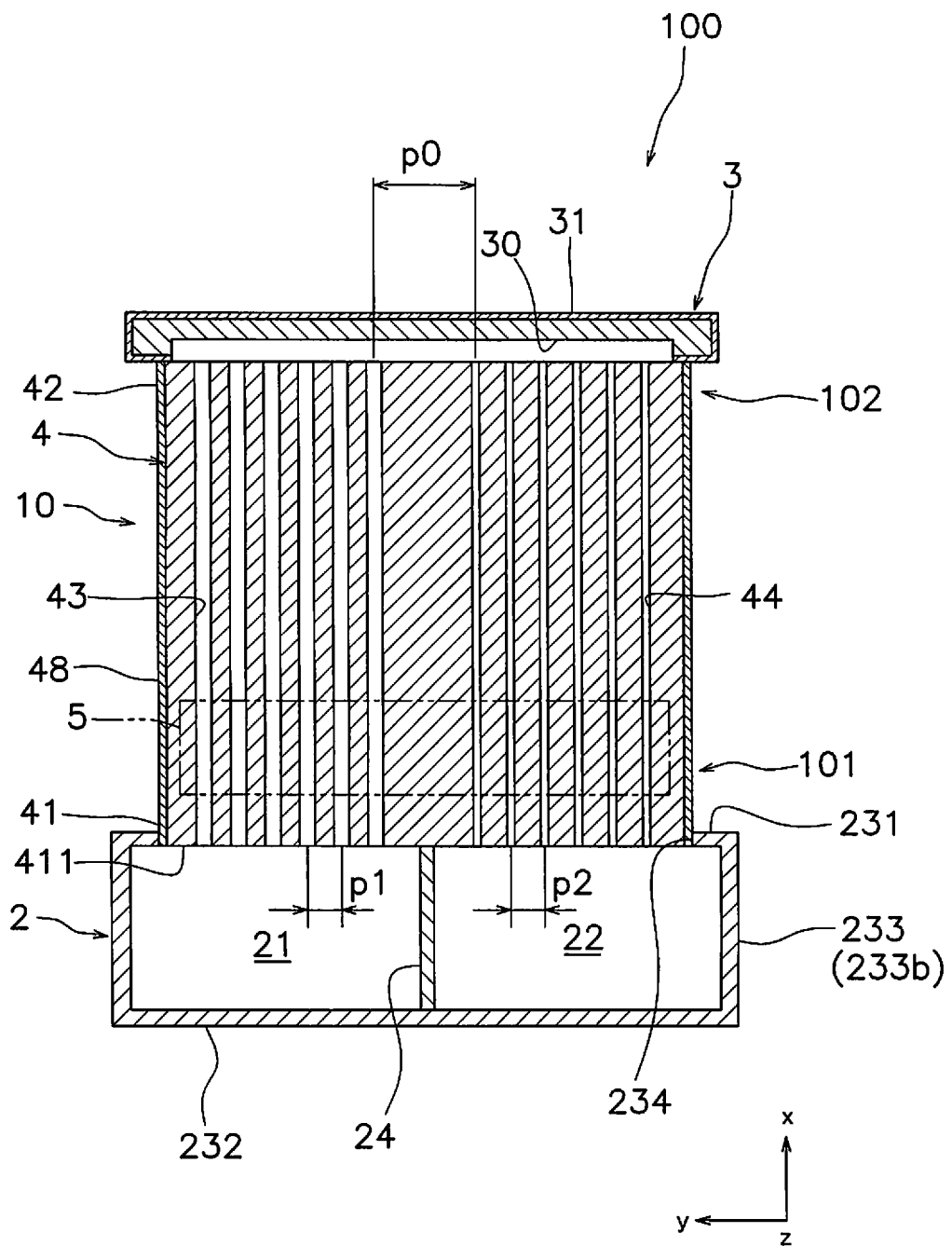
FIG. 4 is a cross-sectional view of the cell stack device.

As shown in FIGS. 2 to 4, the manifold main body 23 includes an upper plate portion 231, a bottom plate portion 232, and a side plate portion 233. As shown in FIG. 2, the side plate portion 233 includes a pair of first side plate portions 233a extending in the width direction of the fuel cells 10 and a pair of second side plate portions 233b extending in the arrangement direction of the fuel cells 10.

As shown in FIG. 3, the upper plate portion 231 of the manifold main body 23 is provided with a plurality of through-holes 234. The through-holes 234 are arranged at intervals in the length direction (the Z-axis direction) of the manifold 2.

The through-holes 234 extend in the width direction (the Y-axis direction) of the manifold main body 23. The through-holes 234 are in communication with the gas supply chamber 21 and the gas collection chamber 22. Note that each through-hole 234 may be divided into a portion that is in communication with the gas supply chamber 21 and a portion that is in communication with the gas collection chamber 22.

Gas Supply Pipe

As shown in FIG. 2, the gas supply pipe 12 is configured to supply a gas to the gas supply chamber 21. The gas supply pipe 12 is connected to the gas supply chamber 21. Specifically, the gas supply pipe 12 is connected to the gas supply chamber 21 on the first end portion 201 side with respect to the center C of the manifold 2, in the arrangement direction (the Z-axis direction) of the fuel cells 10.

The gas supply pipe 12 is attached to the side plate portion 233. Specifically, the gas supply pipe 12 is attached to a first side plate portion 233a. Note that the gas supply pipe 12 supplies a gas from the first side plate portion 233a along the arrangement direction of the fuel cells 10. That is, the gas supply direction of the gas supply pipe 12 is along the arrangement direction of the fuel cells 10. Note that an arrow G1 shown in FIG. 2 indicates the gas supply direction.

Gas Collection Pipe

The gas collection pipe 13 is configured to collect a gas from the gas collection chamber 22. The gas collection pipe 13 is connected to the gas collection chamber 22. The gas collection pipe 13 is connected to the gas collection chamber 22 on the second end portion 202 side with respect to the center C of the manifold 2, in the arrangement direction of the fuel cells 10.

The gas collection pipe 13 is attached to the side plate portion 233. Specifically, the gas collection pipe 13 is attached to a first side plate portion 233a. Note that the gas supply pipe 12 is attached to one of the two first side plate portions 233a and the gas collection pipe 13 is attached to the other of the two first side plate portions 233a.

The gas collection pipe 13 collects gas from the first side plate portion 233a along the arrangement direction of the fuel cells 10. That is, the gas collection direction of the gas collection pipe 13 is along the arrangement direction of the fuel cells 10. Note that an arrow G2 shown in FIG. 2 indicates the gas collection direction.

The gas supply pipe 12 supplies a gas along the gas collection direction of the gas collection pipe 13. That is, the gas supply direction of the gas supply pipe 12 is substantially the same as the gas collection direction of the gas collection pipe 13.

Fuel Cell

As shown in FIG. 4, the fuel cells 10 extend upward from the manifold 2. Specifically, base end portions 101 of the fuel cells 10 are attached to the manifold 2. In this embodiment, the base end portion 101 of a fuel cell 10 refers to a lower end portion and the leading end portion 102 of a fuel cell 10 refers to an upper end portion.

As shown in FIG. 1, the fuel cells 10 are arranged such that the main surfaces of the fuel cells 10 face each other. Also, the fuel cells 10 are arranged at intervals in the length direction (the Z-axis direction) of the manifold 2. That is, the arrangement direction of the fuel cells 10 is along the length direction of the manifold 2. Note that the fuel cells 10 need not be disposed at equal intervals in the length direction of the manifold 2.

Figure 5:
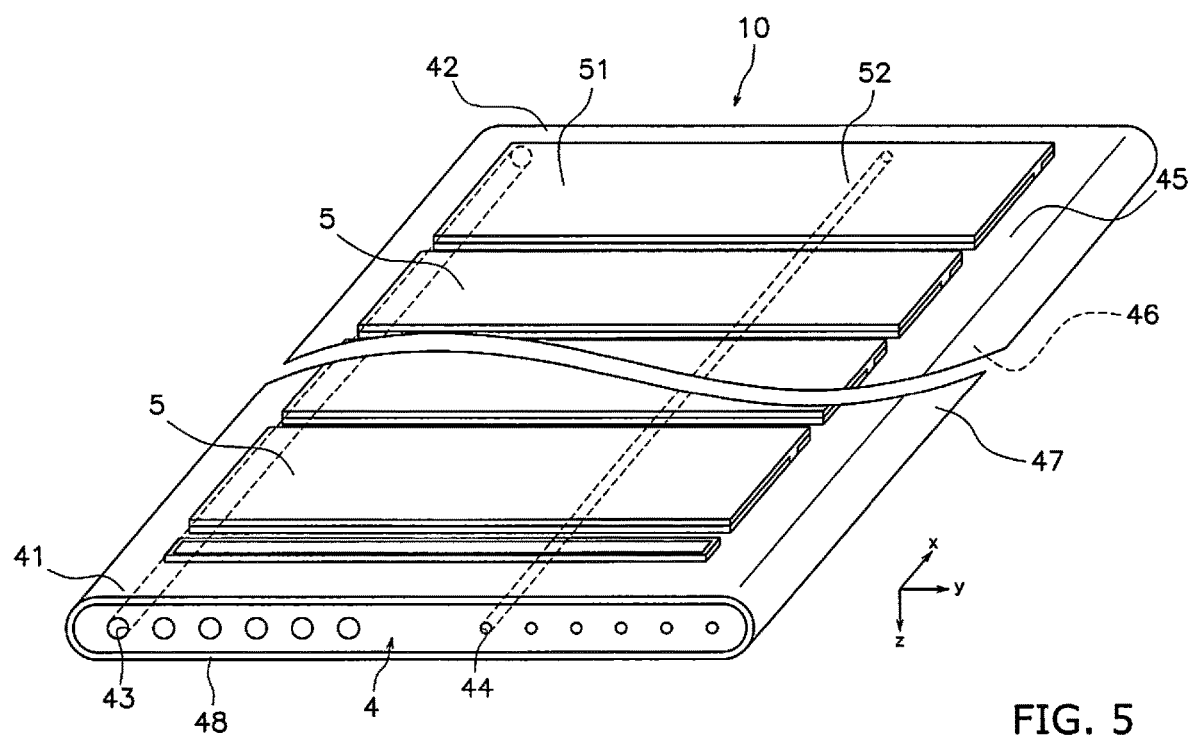
FIG. 5 is a perspective view of the fuel cell.

As shown in FIGS. 4 and 5, the fuel cells 10 each include a support substrate 4, a plurality of power generation element portions 5, and a connection member 3. The power generation element portions 5 are supported on a first main surface 45 and a second main surface 46 of the support substrate 4. Note that the number of power generation element portions 5 formed on the first main surface 45 and the number of power generation element portions 5 formed on the second main surface 46 may be the same or different from each other. Also, the power generation element portions 5 may have different sizes.

Support Substrate

The support substrate 4 extends from the manifold 2 in the vertical direction. Specifically, the support substrate 4 extends upward from the manifold 2. The support substrate 4 has a flat shape and has a base end portion 41 and a leading end portion 42. The base end portion 41 and the leading end portion 42 are both end portions of the support substrate 4 in the length direction (the X-axis direction). In this embodiment, the base end portion 41 of the support substrate 4 refers to a lower end portion, and the leading end portion 42 of the support substrate 4 refers to an upper end portion.

The base end portion 41 of the support substrate 4 is attached to the manifold 2. For example, the base end portion 41 of the support substrate 4 is attached to the upper plate portion 231 of the manifold 2 using a bonding material or the like. Specifically, the base end portion 41 of the support substrate 4 is inserted into a through hole 234 formed in the upper plate portion 231. Note that the base end portion 41 of the support substrate 4 need not be inserted into the through hole 234. As a result of the base end portion 41 of the support substrate 4 being attached to the manifold 2 in this manner, the base end portion 41 of the support substrate 4 is linked to the gas supply chamber 21 and the gas collection chamber 22.

The support substrate 4 includes a plurality of first gas channels 43 and a plurality of second gas channels 44. The first gas channels 43 extend in the vertical direction in the support substrate 4. That is, the first gas channels 43 extend in the length direction (the X-axis direction) of the support substrate 4. The first gas channels 43 pass through the support substrate 4. The first gas channels 43 are disposed spaced apart from each other in the width direction (the Y-axis direction) of the support substrate 4. Note that the first gas channels 43 are preferably disposed at equal intervals. The length of the support substrate 4 in the width direction (the Y-axis direction) may be longer than the length of the support substrate 4 in the length direction (the X-axis direction).

As shown in FIG. 4, a pitch p1 of adjacent first gas channels 43 is about 1 to 5 mm, for example. The pitch p1 of adjacent first gas channels 43 indicates the distance between centers of the first gas channels 43. For example, an average value of pitches obtained by measuring pitches of first gas channels 43 in the base end portion 41, the central portion, and the leading end portion 42 may be used as the pitch p1 of first gas channels 43.

The first gas channels 43 extend from the base end portion 41 of the support substrate 4 toward the leading end portion 42 of the support substrate 4. The first gas channels 43 are connected to the gas supply chamber 21 on the base end portion 41 side in a state in which a fuel cell 10 is attached to the manifold 2.

The second gas channels 44 extend in the vertical direction in the support substrate 4. That is, the second gas channels 44 extend in the length direction (the X-axis direction) of the support substrate 4. The second gas channels 44 extend substantially in parallel to the first gas channels 43.

The second gas channels 44 pass through the support substrate 4. The second gas channels 44 are disposed spaced apart from each other in the width direction (the Y-axis direction) of the support substrate 4. Note that the second gas channels 44 are preferably disposed at equal intervals.

A pitch p2 of adjacent second gas channels 44 is about 1 to 5 mm, for example. The pitch p2 of adjacent second gas channels 44 indicates the distance between centers of the second gas channels 44. For example, an average value of pitches obtained by measuring pitches of second gas channels 44 in the base end portion 41, the central portion, and the leading end portion 42 may be used as the pitch p2 of the second gas channels 44. Note that the pitch p2 between the second gas channels 44 is preferably substantially equal to the pitch p1 between the first gas channels 43.

The second gas channels 44 extend from the leading end portion 42 of the support substrate 4 toward the base end portion 41 of the support substrate 4. The second gas channels 44 are connected to the gas collection chamber 22 of the manifold 2 on the base end portion 41 side in a state in which the fuel cell 10 is attached to the manifold 2.

A pitch p0 of a first gas channel 43 and a second gas channel 44 that are adjacent to each other is about 1 to 10 mm, for example. The pitch p0 of the first gas channel 43 and the second gas channel 44 that are adjacent to each other indicates the distance between the center of the first gas channel 43 and the center of the second gas channel 44. For example, the pitch p0 can be measured on a first end surface 411 of the support substrate 4.

The pitch p0 of the first gas channel 43 and the second gas channel 44 that are adjacent to each other is larger than the pitch p1 of adjacent first gas channels 43. Also, the pitch p0 of the first gas channel 43 and the second gas channel 44 that are adjacent to each other is larger than the pitch p2 of adjacent second gas channels 44.

The first gas channels 43 and the second gas channels 44 are connected to each other on the leading end portion 102 side of the fuel cell 10. Specifically, the first gas channels 43 and the second gas channels 44 are connected to each other via a connection channel 30 of the connection member 3.

The first gas channels 43 and the second gas channels 44 are configured such that a pressure loss of gas in the first gas channels 43 is smaller than a pressure loss of gas in the second gas channels 44. Note that, as in this embodiment, if a plurality of first gas channels 43 and a plurality of second gas channels 44 are present, the first gas channels 43 and the second gas channels 44 are configured such that an average value of pressure losses of gas in the first gas channels 43 is smaller than an average value of pressure losses of gas in the second gas channels 44.

For example, the flow channel cross-sectional area of each first gas channel 43 can be larger than the flow channel cross-sectional area of each second gas channel 44. Note that, if the number of first gas channels 43 is different from the number of second gas channels 44, the sum of the flow channel cross-sectional areas of the first gas channels 43 can be larger than the sum of the flow channel cross-sectional areas of the second gas channels 44.

The sum of the flow channel cross-sectional areas of the second gas channels 44, although not particularly limited, may be set to about 20% to 95% of the sum of the flow channel cross-sectional areas of the first gas channels 43. Note that the flow channel cross-sectional area of a first gas channel 43 may be set to about 0.5 to 20 mm$^2$, for example. Also, the flow channel cross-sectional area of a second gas channel 44 may be set to about 0.1 to 15 mm$^2$, for example.

Note that the flow channel cross-sectional area of the first gas channel 43 refers to the flow channel cross-sectional area of the first gas channel 43 at a cross-section obtained by cutting the first gas channel 43 along a plane (the YZ plane) orthogonal to a direction (the X-axis direction) in which the first gas channel 43 extends. Also, an average value of the flow channel cross-sectional area at any position on the base end portion 41 side, the flow channel cross-sectional area at any position of the central portion, and the flow channel cross-sectional area at any position on the leading end portion 42 side can be used as the flow channel cross-sectional area of the first gas channel 43.

Also, the flow channel cross-sectional area of the second gas channel 44 refers to the flow channel cross-sectional area of the second gas channel 44 at a cross-section obtained by cutting the second gas channel 44 along a plane (the YZ plane) orthogonal to a direction (the X-axis direction) in which the second gas channel 44 extends. Also, an average value of the flow channel cross-sectional area at any position on the base end portion 41 side, the flow channel cross-sectional area at any position of the central portion, and the flow channel cross-sectional area at any position on the leading end portion 42 side can be used as the flow channel cross-sectional area of the second gas channel 44.

As shown in FIG. 5, the support substrate 4 includes a first main surface 45 and a second main surface 46. The first main surface 45 and the second main surface 46 face away from each other. The first main surface 45 and the second main surface 46 support power generation element portions 5. The first main surface 45 and the second main surface 46 are oriented in the thickness direction (the Z-axis direction) of the support substrate 4. Also, side surfaces 47 of the support substrate 4 are oriented in the width direction (the Y-axis direction) of the support substrates 4. The side surfaces 47 may be curved. As shown in FIG. 1, the support substrates 4 are disposed such that the first main surfaces 45 and the second main surfaces 46 face each other.

As shown in FIG. 5, the support substrate 4 supports power generation element portions 5. The support substrate 4 is constituted by a porous material having no electron conductivity. The support substrate 4 is constituted by CSZ (calcia stabilized zirconia), for example. Alternatively, the support substrate 4 may be constituted by NiO (nickel oxide) and YSZ (8YSZ) (yttria-stabilized zirconia), NiO (nickel oxide) and $Y_2O_3$ (yttria), or MgO (magnesium oxide) and $MgAl_2O_4$ (magnesia alumina spinel). The support substrate 4 has a porosity of about 20% to 60%, for example. The porosity is measured using the Archimedes' method, or through microstructure observation, for example.

The support substrate 4 is covered by a compact layer 48. The compact layer 48 is configured to keep a gas that is diffused from the first gas channels 43 and the second gas channels 44 into the support substrate 4 from being ejected to the outside. In this embodiment, the compact layer 48 covers the first main surface 45, the second main surface 46, and the side surfaces 47 of the support substrate 4. Note that, in this embodiment, the compact layer 48 is constituted by electrolytes 7 and interconnectors 91, which will be described later. The compact layer 48 is more compact than the support substrate 4. For example, the compact layer 48 has a porosity of about 0% to 7%.

Power Generation Element Portion

The plurality of power generation element portions 5 are supported on the first main surface 45 and the second main surface 46 of the support substrate 4. The power generation element portions 5 are arranged in the length direction (the X-axis direction) of the support substrate 4. Specifically, the power generation element portions 5 are disposed spaced apart from each other from the base end portion 41 to the leading end portion 42, on the support substrate 4. That is, the power generation element portions 5 are disposed at intervals in the length direction (the X-axis direction) of the support substrate 4. Note that the power generation element portions 5 are connected to each other in series by electrical connection portions 9, which will be described later.

The power generation element portions 5 each extend in the width direction (the Y-axis direction) of the support substrate 4. The power generation element portion 5 is divided into a first portion 51 and a second portion 52 in the width direction of the support substrate 4. Note that there is no strict boundary between the first portion 51 and the second portion 52. For example, in a state in which the fuel cells 10 are attached to the manifold 2, in a longitudinal view (the X-axis view) of the support substrate 4, a portion overlapping the boundary between the gas supply chamber 21 and the gas collection chamber 22 can be referred to as a boundary portion between the first portion 51 and the second portion 52.

In the thickness view (the Z-axis view) of the support substrate 4, the first gas channels 43 overlap the first portions 51 of the power generation element portions 5. Also, in the thickness view (the Z-axis view) of the support substrate 4, the second gas channels 44 overlap the second portions 52 of the power generation element portions 5. Note that some of the first gas channels 43 need not overlap the first portions 51. Similarly, some of the second gas channels 44 need not overlap the second portions 52.

Figure 6:
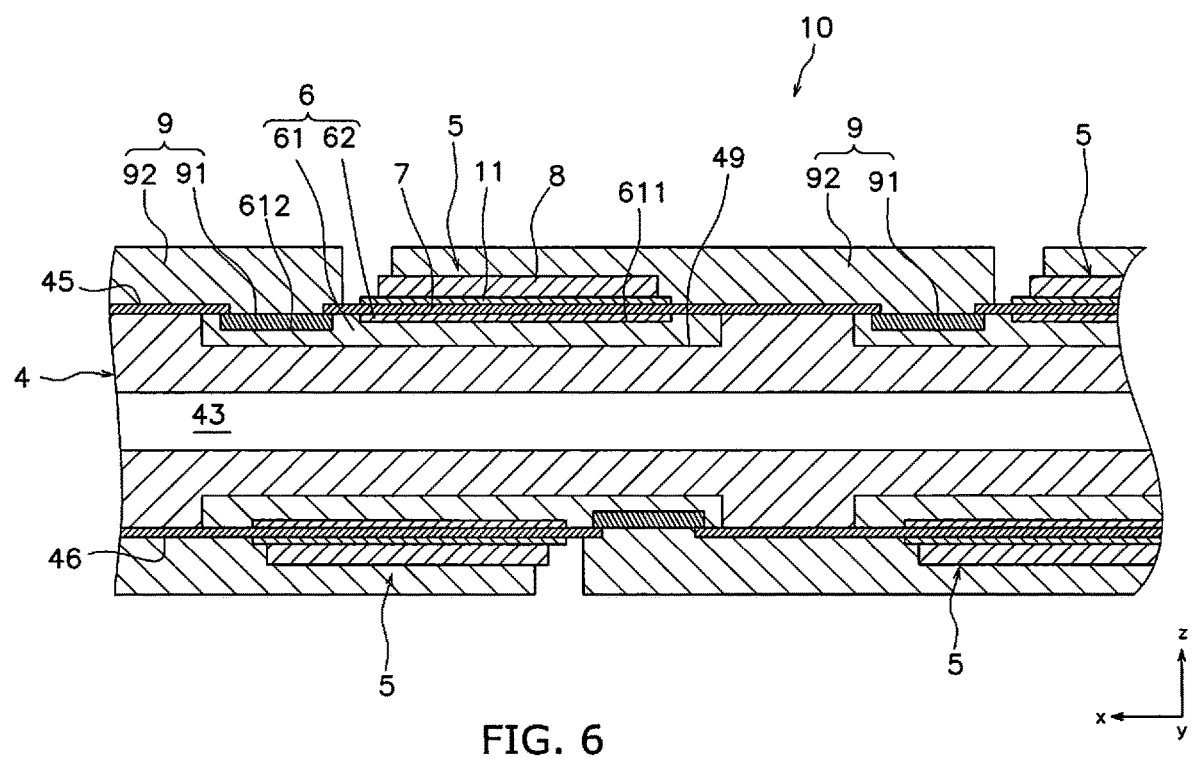
FIG. 6 is a cross-sectional view of the fuel cell.

FIG. 6 is a cross-sectional view of a fuel cell 10 cut along the first gas channel 43. Note that the cross-sectional view of the fuel cell 10 cut along the second gas channel 44 is the same as that in FIG. 6, except that the flow channel cross-sectional area of the second gas channel 44 is different from that in FIG. 6.

The power generation element portions 5 include fuel electrodes 6, the electrolytes 7, and air electrodes 8. Also, the power generation element portions 5 further include reaction preventing films 11. The fuel electrode 6 is a sintered body constituted by a conductive porous material. The fuel electrode 6 includes a fuel electrode current collector portion 61 and a fuel electrode active portion 62.

The fuel electrode current collector portion 61 is disposed in a recess 49. The recess 49 is formed in the support substrate 4. Specifically, the recess 49 is filled with the fuel electrode current collector portion 61, and the fuel electrode current collector portion 61 has the same outer shape as the recess 49. The fuel electrode current collector portions 61 each have a first recess 611 and a second recess 612. The fuel electrode active portion 62 is disposed in the first recess 611. Specifically, the first recess 611 is filled with the fuel electrode active portion 62.

The fuel electrode current collector portion 61 may be constituted by NiO (nickel oxide) and YSZ (8YSZ) (yttria-stabilized zirconia), for example. Alternatively, the fuel electrode current collector portion 61 may also be constituted by NiO (nickel oxide) and $Y_2O_3$ (yttria), or NiO (nickel oxide) and CSZ (calcia stabilized zirconia). The fuel electrode current collector portion 61 has a thickness of about 50 to 500 μm and the recess 49 have a depth of about 50 to 500 μm.

The fuel electrode active portion 62 may be constituted by NiO (nickel oxide) and YSZ (8YSZ) (yttria-stabilized zirconia), for example. Alternatively, the fuel electrode active portion 62 may also be constituted by NiO (nickel oxide) and GDC (gadolinium doped ceria). The fuel electrode active portion 62 has a thickness of 5 to 30 μm.

The electrolyte 7 is disposed covering the fuel electrode 6. Specifically, the electrolyte 7 extends in the length direction from one interconnector 91 to another interconnector 91. That is, the electrolytes 7 and the interconnectors 91 are disposed in an alternating manner in the length direction (the X-axis direction) of the support substrate 4. Also, the electrolytes 7 cover the first main surface 45, the second main surface 46, and the side surfaces 47 of the support substrate 4.

The electrolyte 7 is more compact than the support substrate 4. For example, the electrolyte 7 has a porosity of about 0% to 7%. The electrolyte 7 is a sintered body constituted by a compact material having an ionic conductivity and no electron conductivity. The electrolyte 7 may be constituted by YSZ (8YSZ) (yttria-stabilized zirconia), for example. Alternatively, the electrolyte 7 may also be constituted by LSGM (lanthanum gallate). The electrolyte 7 has a thickness of about 3 to 50 μm, for example.

The reaction preventing film 11 is a sintered body constituted by a compact material. The reaction preventing film 11 has a shape that is substantially the same as that of the fuel electrode active portion 62, in a plan view. The reaction preventing film 11 is disposed at a position corresponding to the fuel electrode active portion 62 via the electrolyte 7. The reaction preventing film 11 is provided in order to suppress the occurrence of a phenomenon in which a reaction layer with a large electric resistance is formed at an interface between the electrolyte 7 and the air electrode 8 through a reaction between YSZ in the electrolyte 7 and Sr in the air electrode 8. The reaction preventing film 11 may be constituted by GDC=(Ce, Gd)O$_2$ (gadolinium doped ceria), for example. The reaction preventing film 11 has a thickness of about 3 to 50 μm, for example.

The air electrode 8 is disposed on the reaction preventing film 11. The air electrode 8 is a sintered body constituted by a conductive porous material. The air electrode 8 may be constituted by LSCF=(La, Sr) (Co, Fe)O$_3$ (lanthanum strontium cobalt ferrite), for example. Alternatively, the air electrode 8 may also be constituted by LSF=(La, Sr)FeO$_3$ (lanthanum strontium ferrite), LNF=La(Ni, Fe)O$_3$ (lanthanum nickel ferrite), LSC=(La, Sr)CoO$_3$ (lanthanum strontium cobaltite), or the like. Also, the air electrode 8 may be constituted by two layers of a first layer (inner layer) constituted by LSCF and a second layer (outer layer) constituted by LSC. The air electrode 8 has a thickness of 10 to 100 μm, for example.

Electrical Connection Portion

An electrical connection portion 9 is configured to electrically connect adjacent power generation element portions 5. The electrical connection portion 9 includes an interconnector 91 and an air electrode current collector film 92. The interconnector 91 is disposed in the second recess 612. Specifically, the interconnector 91 is embedded in the second recess 612 (the second recess 612 is filled with the interconnector 91). The interconnector 91 is a sintered body constituted by a conductive compact material. The interconnector 91 is more compact than the support substrate 4. The interconnector 91 has a porosity of about 0% to 7%, for example. The interconnector 91 may be constituted by LaCrO$_3$ (lanthanum chromite), for example. Alternatively, the interconnector 91 may also be constituted by (Sr, La)TiO$_3$ (strontium titanate). The interconnector 91 has a thickness of 10 to 100 μm, for example.

The air electrode current collector film 92 is disposed to extend between the interconnector 91 and the air electrode 8 of adjacent power generation element portions 5. For example, the air electrode current collector film 92 is disposed such that the air electrode 8 of the power generation element portion 5 disposed on the left side in FIG. 6 and the interconnector 91 of the power generation element portion 5 disposed on the right side in FIG. 6 are electrically connected to each other. The air electrode current collector film 92 is a sintered body constituted by a conductive porous material.

The air electrode current collector film 92 may be constituted by LSCF=(La, Sr)(Co, Fe)O$_3$ (lanthanum strontium cobalt ferrite), for example. Alternatively, the air electrode current collector film 92 may also be constituted by LSC=(La, Sr)CoO$_3$ (lanthanum strontium cobaltite). Alternatively, the air electrode current collector film 92 may also be constituted by Ag (silver) or Ag—Pd (a silver palladium alloy). The air electrode current collector film 92 has a thickness of about 50 to 500 μm, for example.

Connection Member

As shown in FIG. 4, the connection member 3 is attached to the leading end portion 42 of the support substrate 4. Also, the connection member 3 includes a connection channel 30 for connecting the first gas channels 43 and the second gas channels 44. Specifically, the connection channel 30 connects the first gas channels 43 and the second gas channels 44. The connection channel 30 is constituted by a space extending from the first gas channels 43 to the second gas channels 44. The connection member 3 is preferably joined to the support substrate 4. Also, the connection member 3 is preferably formed integrally with the support substrate 4. The number of connection channels 30 is smaller than the number of first gas channels 43. In this embodiment, a plurality of first gas channels 43 and a plurality of second gas channels 44 are connected to each other by only one connection channel 30.

The connection member 3 is a porous member, for example. Also, the connection member 3 includes a compact layer 31 constituting the outer surface thereof. The compact layer 31 is more compact than the main body of the connection member 3. For example, the compact layer 31 has a porosity of about 0% to 7%. This compact layer 31 may be made of the same material as the connection member 3, a material used in the above-described electrolyte 7, crystallized glass, or the like.

Method for Generating Power

In the cell stack device 100 configured as described above, a fuel gas such as hydrogen gas is supplied to the gas supply chamber 21 of the manifold 2, and the fuel cells 10 are exposed to a gas containing oxygen, such as air. Then, a chemical reaction indicated by Equation (1) below occurs in the air electrode 8, a chemical reaction indicated by Equation (2) occurs in the fuel electrode 6, and a current flows.

$$(\tfrac{1}{2}).O_2 + 2e^- \rightarrow O^{2-} \tag{1}$$

$$H_2 + O^{2-} \rightarrow H_2O + 2e^- \tag{2}$$

Specifically, fuel gas supplied from the gas supply pipe 12 to the gas supply chamber 21 flows through the first gas channels 43 of the fuel cells 10 and the chemical reaction indicated by Equation (2) above occurs in the fuel electrodes 6 of the power generation element portions 5. Unreacted fuel gas in the fuel electrodes 6 leaves the first gas channels 43 and is supplied to the second gas channels 44 via the connection channel 30 of the connection member 3. Then, the fuel gas supplied to the second gas channels 44 undergoes the chemical reaction indicated by Equation (2) above in the fuel electrodes 6 again. Unreacted fuel gas in the fuel electrodes 6 in a process in which the fuel gas flows through the second gas channels 44 is collected in the gas collection chamber 22 of the manifold 2. Also, the gas collection pipe 13 collects the gas from the gas collection chamber 22.

Variations

Although embodiments of the present invention have been described above, the present invention is not limited thereto, and various modifications can be made without departing from the spirit of the present invention.

Variation 1

Figure 7:
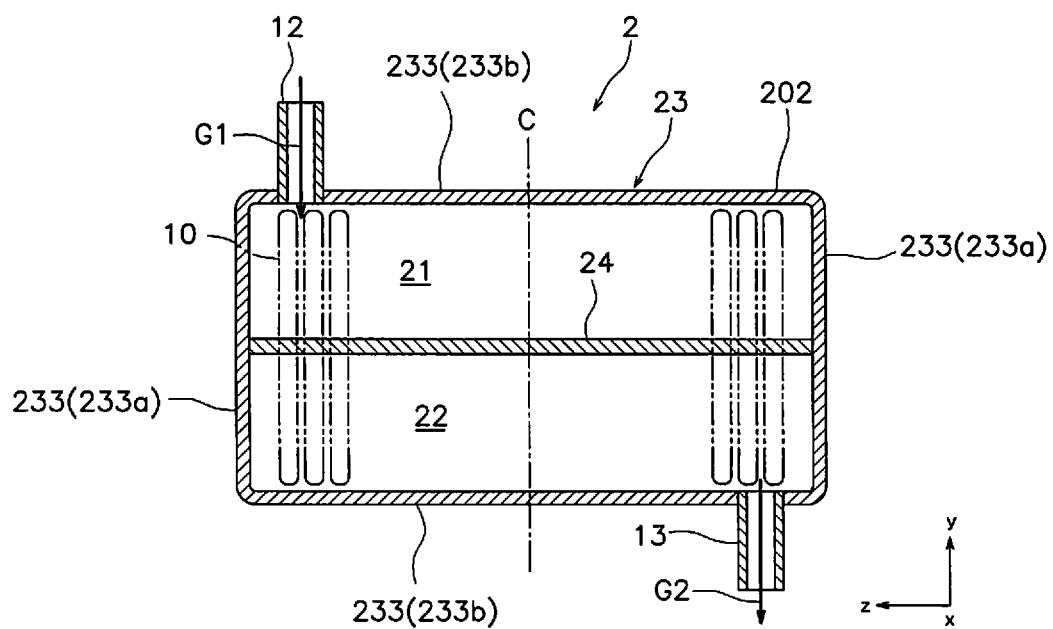
FIG. 7 is a cross-sectional view of a manifold according to a variation.

Although the gas supply pipe 12 and the gas collection pipe 13 are attached to the first side plate portions 233a in the above-described embodiment, the configuration thereof is not limited thereto. As shown in FIG. 7, for example, the gas supply pipe 12 and the gas collection pipe 13 may be attached to the second side plate portions 233b. Note that the gas supply pipe 12 is attached to one of the two second side plate portions 233b and the gas collection pipe 13 is attached to the other of the two second side plate portion 233b.

Also, the gas supply pipe 12 may supply a gas along the width direction (the Y-axis direction) of the fuel cells 10. Similarly, the gas collection pipe 13 may collect a gas along the width direction (the Y-axis direction) of the fuel cells 10.

Variation 2

Figure 8:
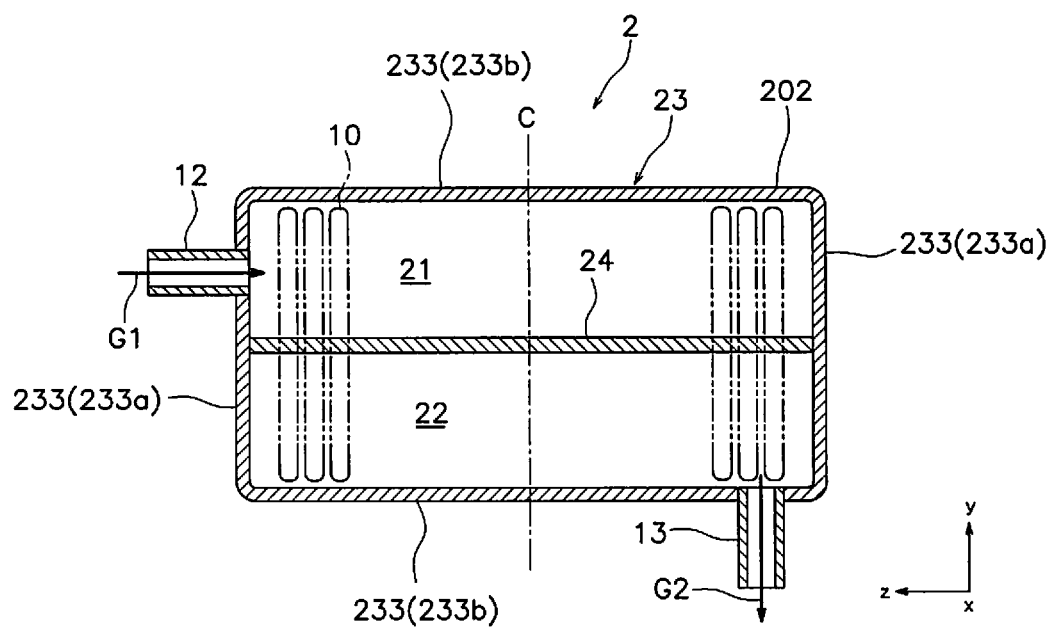
FIG. 8 is a cross-sectional view of a manifold according to a variation.

Although the gas supply pipe 12 supplies a gas along the gas collection direction of the gas collection pipe 13 in the above-described embodiment, the configuration thereof is not limited thereto. As shown in FIG. 8, for example, the gas supply pipe 12 may supply a gas in a direction intersecting the gas collection direction of the gas collection pipe 13. Specifically, the gas supply pipe 12 may supply a gas along the arrangement direction (the Z-axis direction) of the fuel cells 10, and the gas collection pipe 13 may collect a gas along the width direction (the Y-axis direction) of the fuel cells 10. In this case, the gas supply pipe 12 is attached to a first side plate portion 233a, and the gas collection pipe 13 is attached to a second side plate portion 233b.

Figure 9:
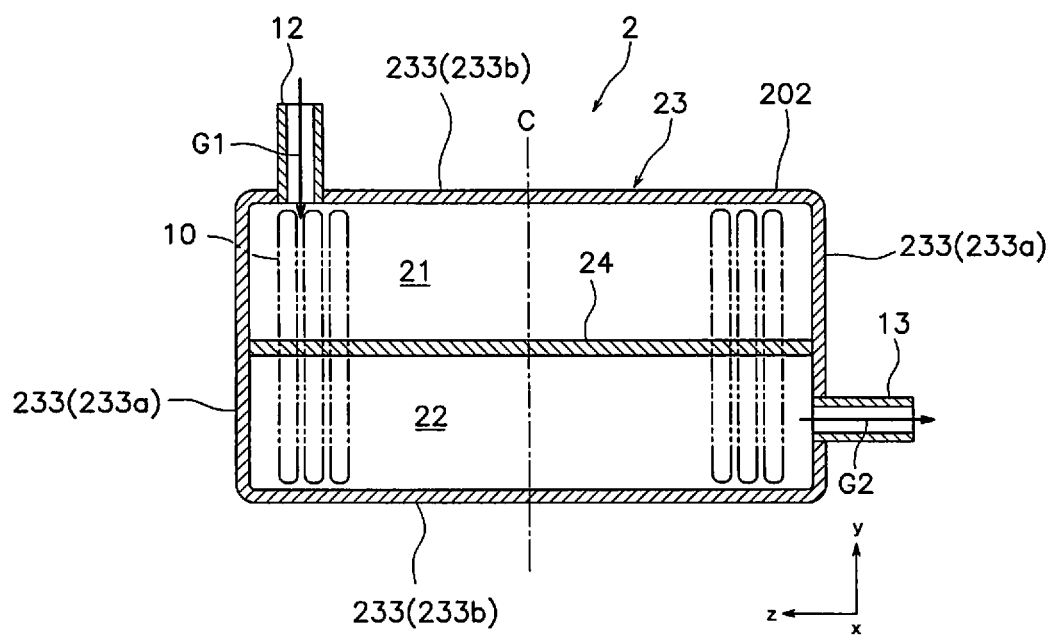
FIG. 9 is a cross-sectional view of a manifold according to a variation.

Also, as shown in FIG. 9, the gas supply pipe 12 may supply a gas along the width direction (the Y-axis direction) of the fuel cells 10 and the gas collection pipe 13 may collect a gas along the arrangement direction (the Z-axis direction) of the fuel cells 10. In this case, the gas supply pipe 12 is attached to a second side plate portion 233b and the gas collection pipe 13 is attached to a first side plate portion 233a.

Variation 3

Although the gas supply pipe 12 and the gas collection pipe 13 are attached to the side plate portion 233 in the above-described embodiment, the configuration thereof is not limited thereto. At least one of the gas supply pipe 12 and the gas collection pipe 13 may be attached to the upper plate portion 231 or the bottom plate portion 232.

Variation 4

Figure 10:
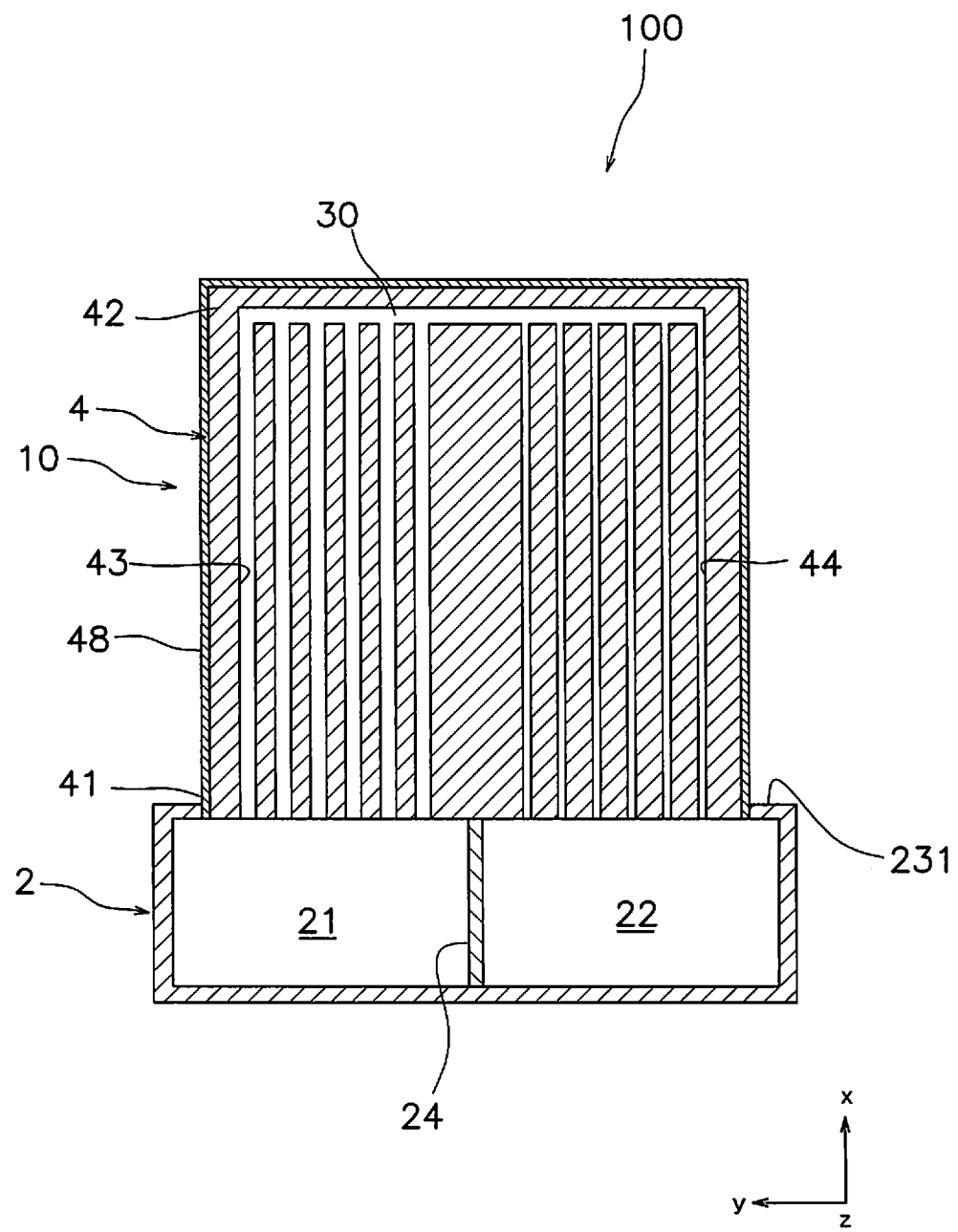
FIG. 10 is a cross-sectional view of a cell stack device according to a variation.

Although the first gas channels 43 and the second gas channels 44 are connected to each other by the connection channel 30 of the connection member 3 in the above-described embodiment, the configuration thereof is not limited thereto. For example, as shown in FIG. 10, the inner portion of the support substrate 4 may include the connection channel 30. In this case, the cell stack device 100 need not include the connection member 3. The first gas channels 43 and the second gas channels 44 are connected to each other by the connection channel 30 formed in the support substrate 4.

Variation 5

The first gas channels 43 may have different flow channel cross-sectional areas. Also, the second gas channels 44 may have different flow channel cross-sectional areas. Also, the flow channel cross-sectional area of the first gas channel 43 may be substantially the same as or smaller than the flow channel cross-sectional area of the second gas channel 44.

Variation 6

Figure 11:
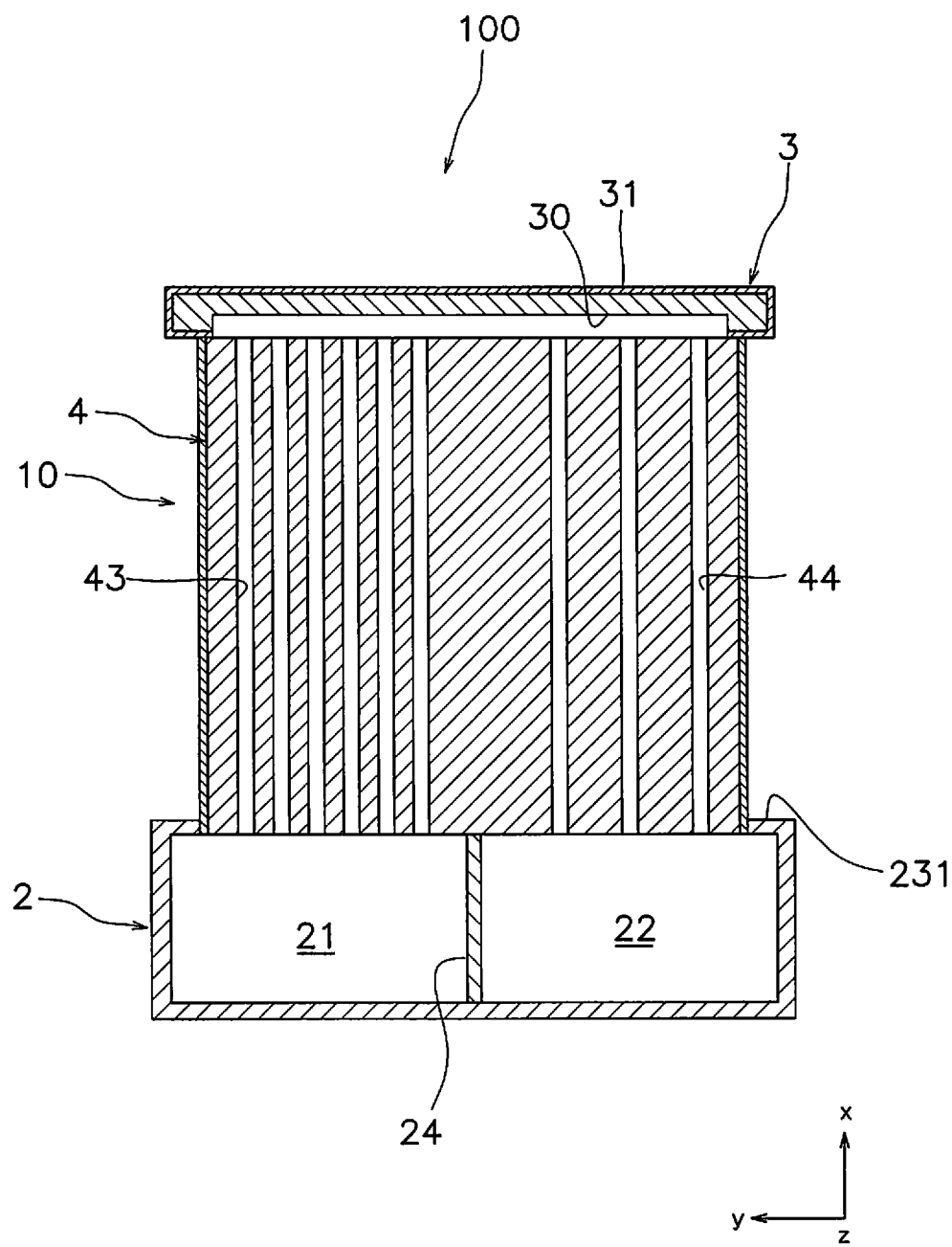
FIG. 11 is a cross-sectional view of a cell stack device according to a variation.

Although the number of second gas channels 44 is the same as the number of first gas channels 43 in the above-described embodiment, the number of second gas channels 44 is not limited thereto. For example, as shown in FIG. 11, the number of second gas channels 44 may be smaller than the number of first gas channels 43.

Variation 7

The first gas channel 43 need not have an even flow channel cross-sectional area in its length direction (the X-axis direction). Specifically, the flow channel cross-sectional area of the first gas channel 43 may become smaller toward the leading end portion 42 where the concentration of fuel gas decreases. Also, the second gas channel 44 need not have an even flow channel cross-sectional area in the length direction (the X-axis direction). Specifically, the flow channel cross-sectional area of the second gas channels 44 may become smaller toward the base end portion 41 where the concentration of fuel gas decreases. This configuration makes it possible to keep Ni whose diffusibility is increased and that is present in the vicinity of an interface from changing into NiO.

Variation 8

Although the first and second gas channels 43 and 44 have a circular cross-section in the above-described embodiment, the cross-sectional shape of the first and second gas channels 43 and 44 may be a rectangle or an eclipse.

Variation 9

The support substrate 4 includes a plurality of first gas channels 43 in the above-described embodiment but may include only one first gas channel 43. Similarly, the support substrate 4 includes a plurality of second gas channels 44 but may include only one second gas channel 44.

Variation 10

Although the power generation element portions 5 disposed on the first main surface 45 are connected to each other in series in the above-described embodiment, it is not necessary for all the power generation element portions 5 disposed on the first main surface 45 to be connected to each other in series. Note that the same applies to the power generation element portions 5 disposed on the second main surface 46.

Variation 11

In the fuel cell 10, spaces between the power generation element portions 5 formed on the first main surface 45 and the power generation element portions 5 formed on the second main surface 46 need not be electrically connected to each other or may be electrically connected to each other at a plurality of portions.

Variation 12

The power generation element portions 5 are disposed on both the first main surface 45 and the second main surface 46 in the above-described embodiment but may be disposed on only one of the first main surface 45 and the second main surface 46.

Variation 13

The fuel cells 10 may have different widths. Also, the power generation element portions 5 may have different widths. For example, the width of each power generation element portion 5 formed on a given support substrate 4 may be different from the width of each power generation element portion 5 formed on another support substrate 4.

Variation 14

Although the connection member 3 is a porous member in an embodiment, the connection member 3 may be constituted by a metal. Specifically, the connection member 3 can be constituted by an Fe—Cr alloy, a Ni-based alloy, a MgO-based ceramic material (may be the same material as the support substrate 4), or the like.

Variation 15

Figure 12:
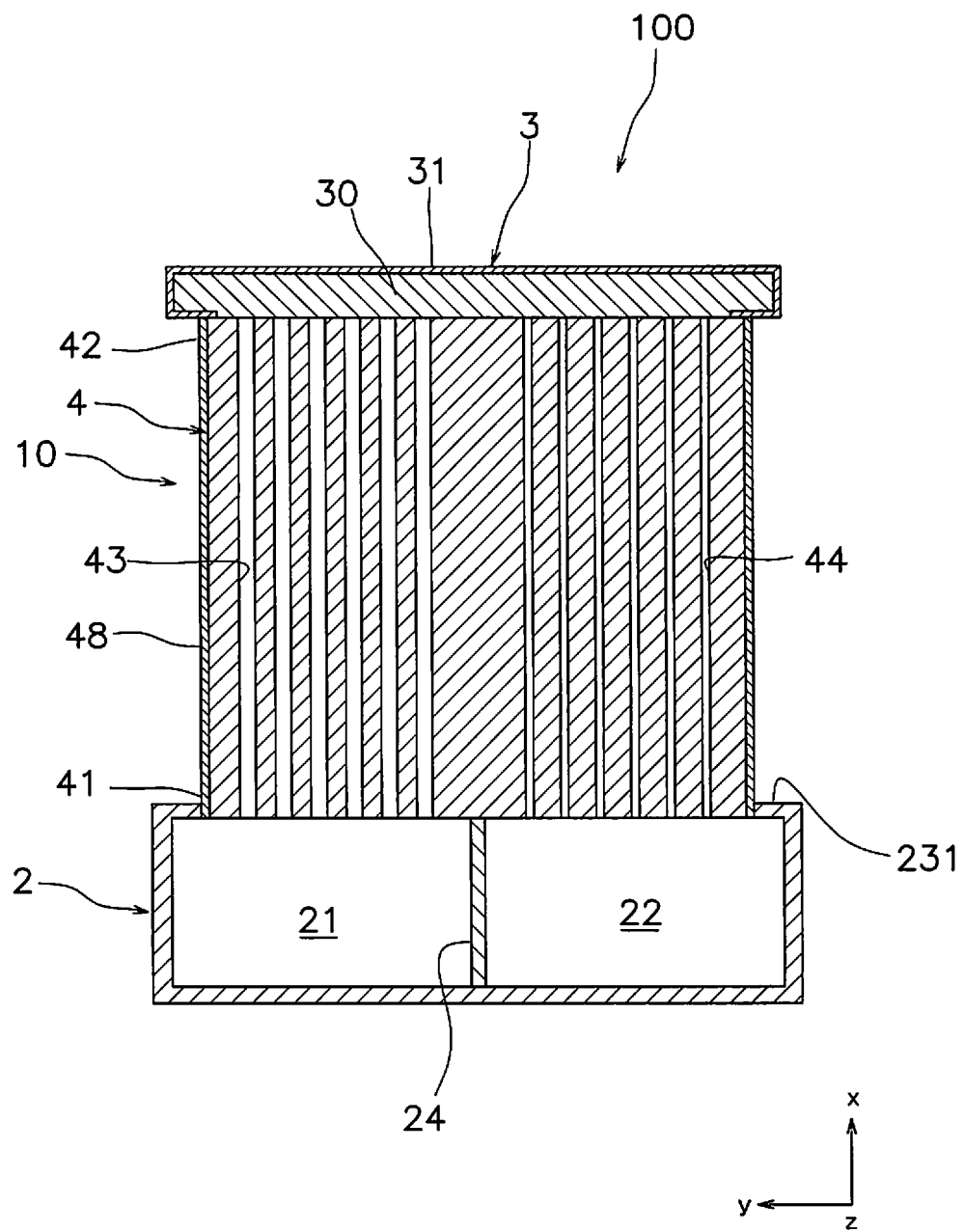
FIG. 12 is a cross-sectional view of a cell stack device according to a variation.

Although the connection channel 30 of the connection member 3 is constituted by a space in the above-described embodiment, the configuration of the connection channel 30 of the connection member 3 is not limited thereto. For example, as shown in FIG. 12, the connection channel 30 of the connection member 3 can be constituted by a plurality of pores formed in the connection member 3.

Variation 16

Although, as a result of partitioning one manifold main body 23 by using the partition plate 24, the gas supply chamber 21 and the gas collection chamber 22 are defined in the manifold 2 of the above-described embodiment, the configuration of the manifold 2 is not limited thereto. For example, the manifold 2 can also be constituted by two manifold main bodies 23. In this case, one manifold main body 23 includes the gas supply chamber 21 and another manifold main body 23 includes the gas collection chamber 22.

Variation 17

Although the fuel cells 10 of the above-described embodiment are so-called horizontal-stripe type fuel cells in which the power generation element portions 5 are arranged in the length direction (the X-axis direction) of the support substrate 4, the configuration of the fuel cells 10 is not limited thereto. For example, the fuel cells 10 may be so-called vertical-stripe type fuel cells in which one power generation element portion 5 is supported on the first main surface 45 of the support substrate 4. In this case, one power generation element portion 5 may be or need not be supported on the second main surface 46 of the support substrate 4.

Variation 18

Although an electrochemical cell is used as a solid oxide fuel cell (SOFC) in the above-described embodiment, the present invention is not limited thereto. An electrochemical cell can also be used as a solid oxide electrolysis cell (SOEC), for example.

The invention claimed is:

1. A cell stack device comprising:
a plurality of electrochemical cells disposed spaced apart from each other;
a manifold including a gas supply chamber and a gas collection chamber, the gas supply chamber and the gas collection chamber extending in an arrangement direction of the plurality of electrochemical cells, the manifold supporting base end portions of the plurality of electrochemical cells;
a gas supply portion configured to supply a gas to the gas supply chamber, the gas supply portion being connected to the gas supply chamber; and
a gas collection portion configured to collect a gas from the gas collection chamber, the gas collection portion being connected to the gas collection chamber,
wherein the plurality of electrochemical cells each include
a unitary support substrate extending from the manifold, and
a power generation element portion supported by the unitary support substrate,
the unitary support substrate includes
a plurality of first gas channels connected to the gas supply chamber, the plurality of first gas channels extending from a base end portion of the unitary support substrate to a leading end portion of the unitary support substrate, and
at least one second gas channel connected to the gas collection chamber, the at least one second gas channel extending from the base end portion of the unitary support substrate to the leading end portion of the unitary support substrate, the at least one second gas channel being connected to the plurality of first gas channels at a leading end portion of each of the plurality of electrochemical cells,
p1 is the average value of the distances between the centers of adjacent first gas channels, p0 is the distance between the center of a first gas channel and the center of an adjacent second gas channel, p0>p1,
wherein a cross-sectional area of the plurality of first gas channels is larger than a cross-sectional area of the at least one second as channel,
the gas supply portion is connected to the gas supply chamber on a first end portion side of the manifold in the arrangement direction, with respect to a center of the manifold,
the unitary support substrate k made of a porous material and k electron nonconductive,
only the unitary support substrate k provided between the plurality of first gas channels and the at least one second gas channel, and
the gas collection portion is connected to the gas collection chamber on a second end portion side of the manifold in the arrangement direction, with respect to the center of the manifold.

2. The cell stack device according to claim 1,
wherein the gas supply portion is configured to supply a gas in a gas collection direction of the gas collection portion.

3. The cell stack device according to claim 1,
wherein the gas supply portion is configured to supply gas in a direction intersecting the gas collection direction of the gas collection portion.

4. The cell stack device according to claim 1,
wherein the gas supply portion is configured to supply gas in the arrangement direction.

5. The cell stack device according to claim 1,
wherein the gas supply portion is configured to supply gas in a width direction of the electrochemical cell.

6. The cell stack device according to claim 1,
wherein the unitary support substrate further includes a connection channel connecting the plurality of first gas channels and the at least one second gas channel at the leading end portion of the unitary support substrate.

7. The cell stack device according to claim 1,
wherein the electrochemical cell further includes a connection member attached to the leading end portion of the unitary support substrate, and
the connection member includes a connection channel connecting the plurality of first gas channels and the at least one second gas channel.

* * * * *